US005692337A

United States Patent [19]
Motz, Jr.

[11] Patent Number: 5,692,337
[45] Date of Patent: Dec. 2, 1997

[54] COLLAPSIBLE PLANT SHELTER

[76] Inventor: Ronald W. Motz, Jr., P.O. Box 5234, El Dorado Hills, Calif. 95630

[21] Appl. No.: 484,102

[22] Filed: Jun. 7, 1995

[51] Int. Cl.$^6$ .................................................. A01G 13/00
[52] U.S. Cl. .............................................. 47/30; 47/DIG. 6
[58] Field of Search ............................. 47/30 OT, 1.01, 47/17 MD, DIG. 6

[56] References Cited

U.S. PATENT DOCUMENTS

| | | | |
|---|---|---|---|
| 2,005,326 | 6/1935 | Schindler | 47/30 |
| 4,829,707 | 5/1989 | Koffler | 47/30 OT |
| 5,090,155 | 2/1992 | Rodgers | 47/30 OT |
| 5,347,750 | 9/1994 | Mills | 47/30 OT |

FOREIGN PATENT DOCUMENTS

| | | | |
|---|---|---|---|
| 2104366 | 3/1983 | United Kingdom | 47/30 OT |
| 2148684 | 6/1985 | United Kingdom | 47/30 OT |
| 2187072 | 9/1987 | United Kingdom | 47/30 OT |
| 01904 | 4/1987 | WIPO | 47/30 OT |

*Primary Examiner*—Henry E. Raduazo
*Attorney, Agent, or Firm*—Bradley P. Heisler

[57] ABSTRACT

A collapsible plant shelter is provided which can be readily erected into a cylindrical form of either elliptical or polygonal cross section and readily collapsed into a substantially flat contour for storage. To erect the shelter, the film is provided in a rectangular planar sheet and then rolled into a cylinder. The film is maintained in its cylindrical form by inserting it within a flexible sleeve. The film has sufficient resiliency that it maintains an elliptical cross section when held within the flexible outer sleeve. The sleeve and film are both formed of at least partially transparent material to allow some light to pass through the sleeve and film and into the shelter. To collapse the shelter, the film is merely removed from within the sleeve and allowed to return to its planar orientation. The cylinder of the plant shelter can take on a polygonal cross section by creasing corners into the material which deform the film so that it resiliently returns to its polygonal shape rather than to a planar shape. In the polygonal arrangement, the film is either adhesively closed or with other attachment means to maintain a cylindrical shape. When the shelter is provided with an even number of corners, it can be readily collapsed with two corners collapsing to have an interior angle of 0° and all other corners collapsing to have an interior angle of 180°. In this way, the polygonal shelter can be collapsed totally flat when a compressive force is applied. When the compressive force is released, the shelter resiliently snaps back to its original cylindrical form.

14 Claims, 7 Drawing Sheets

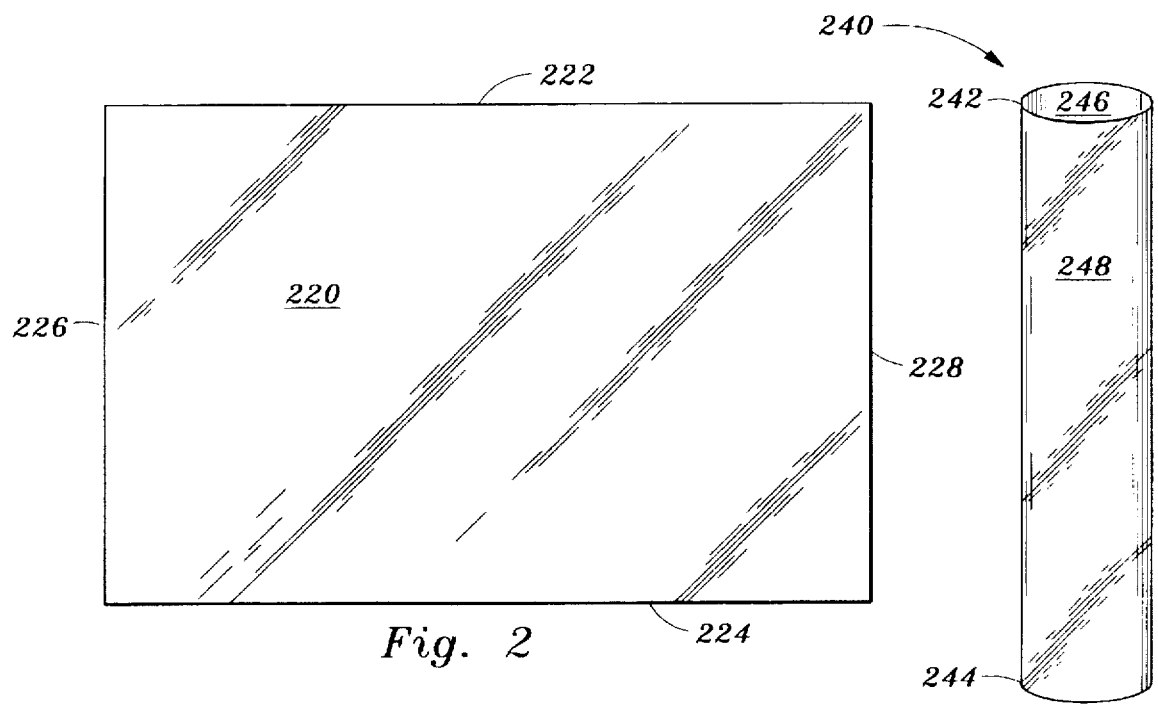
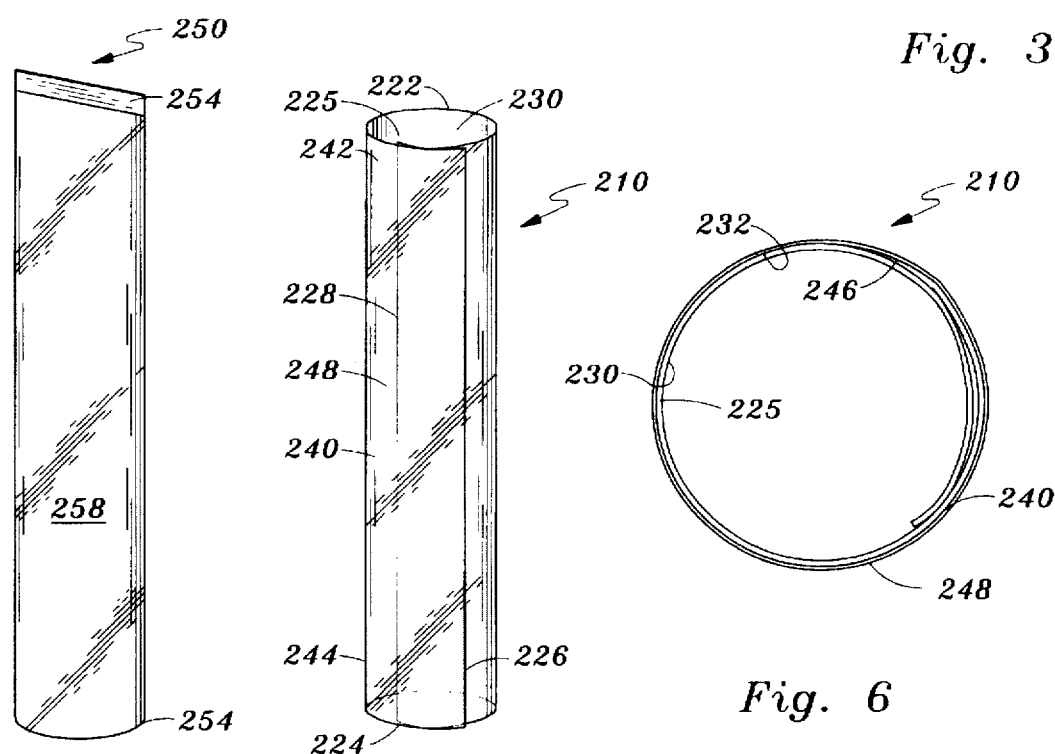
Fig. 2
Fig. 3
Fig. 4
Fig. 5
Fig. 6

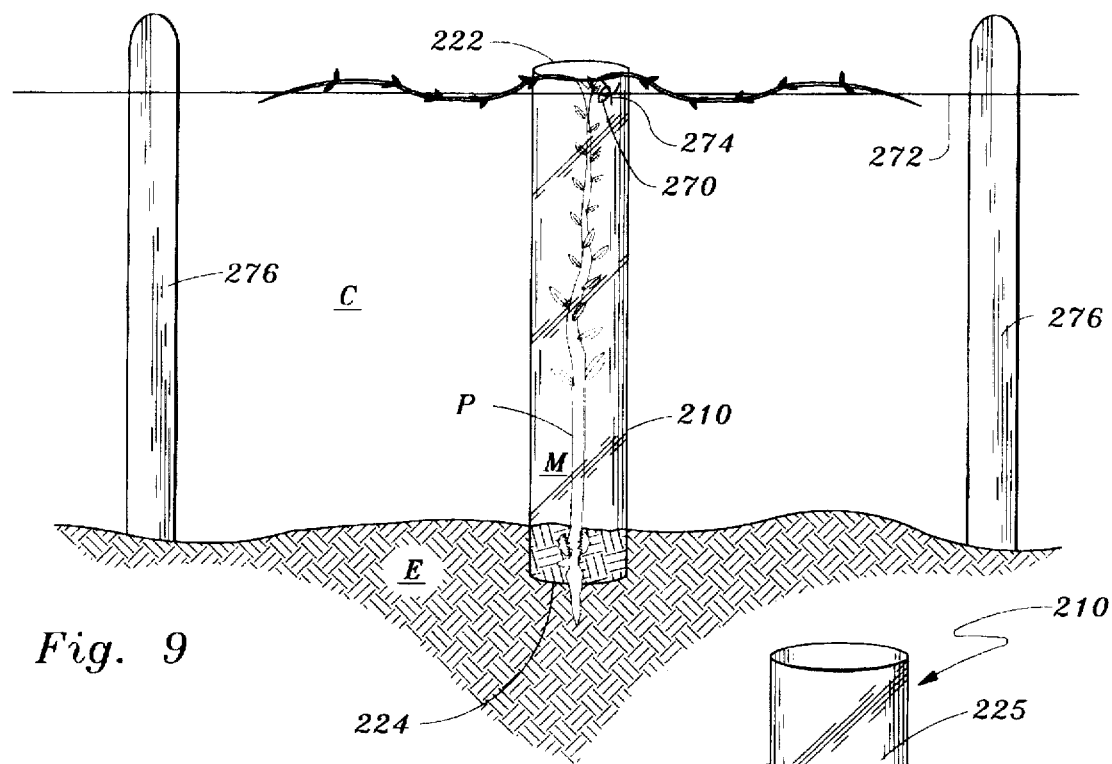
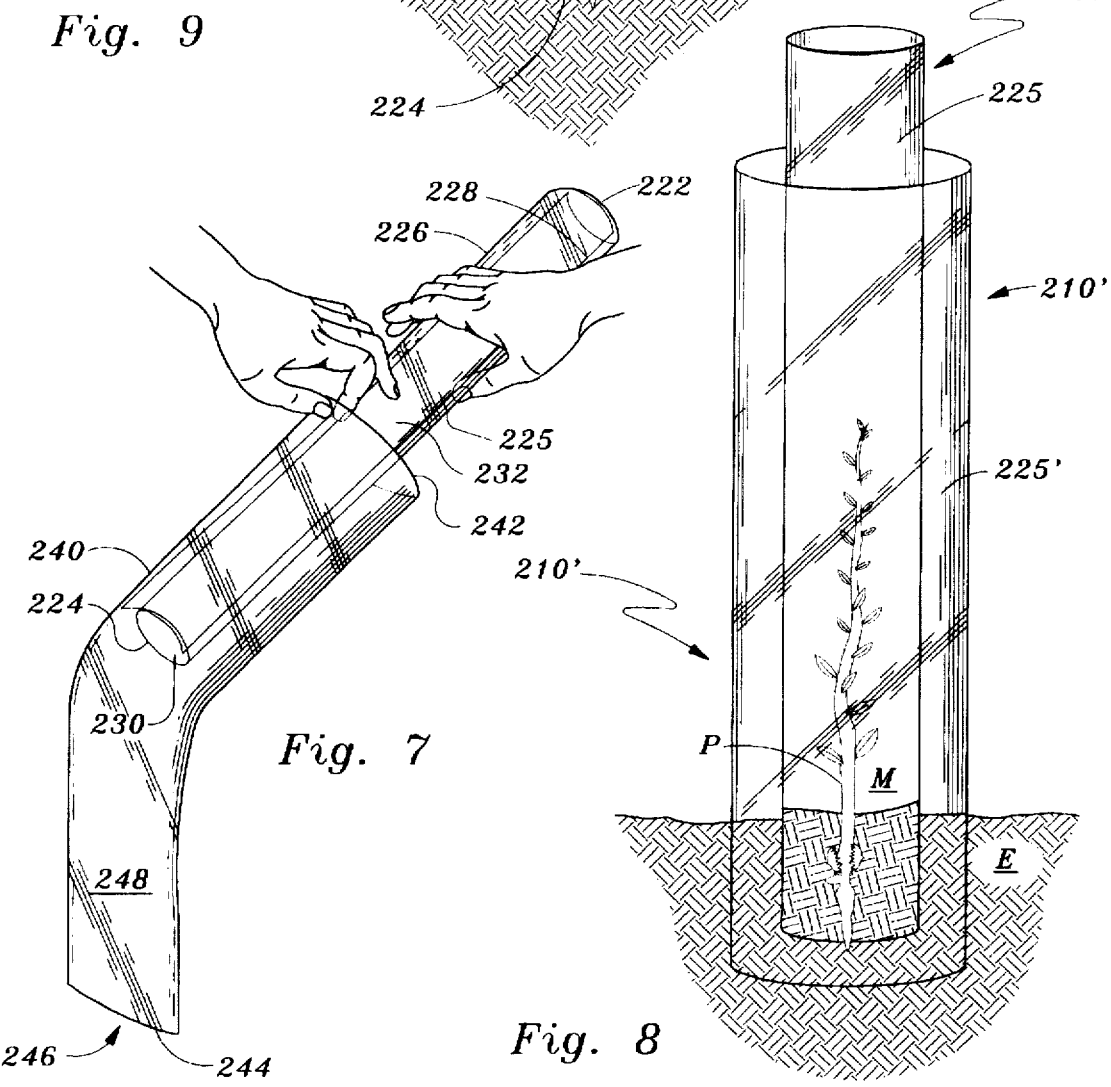

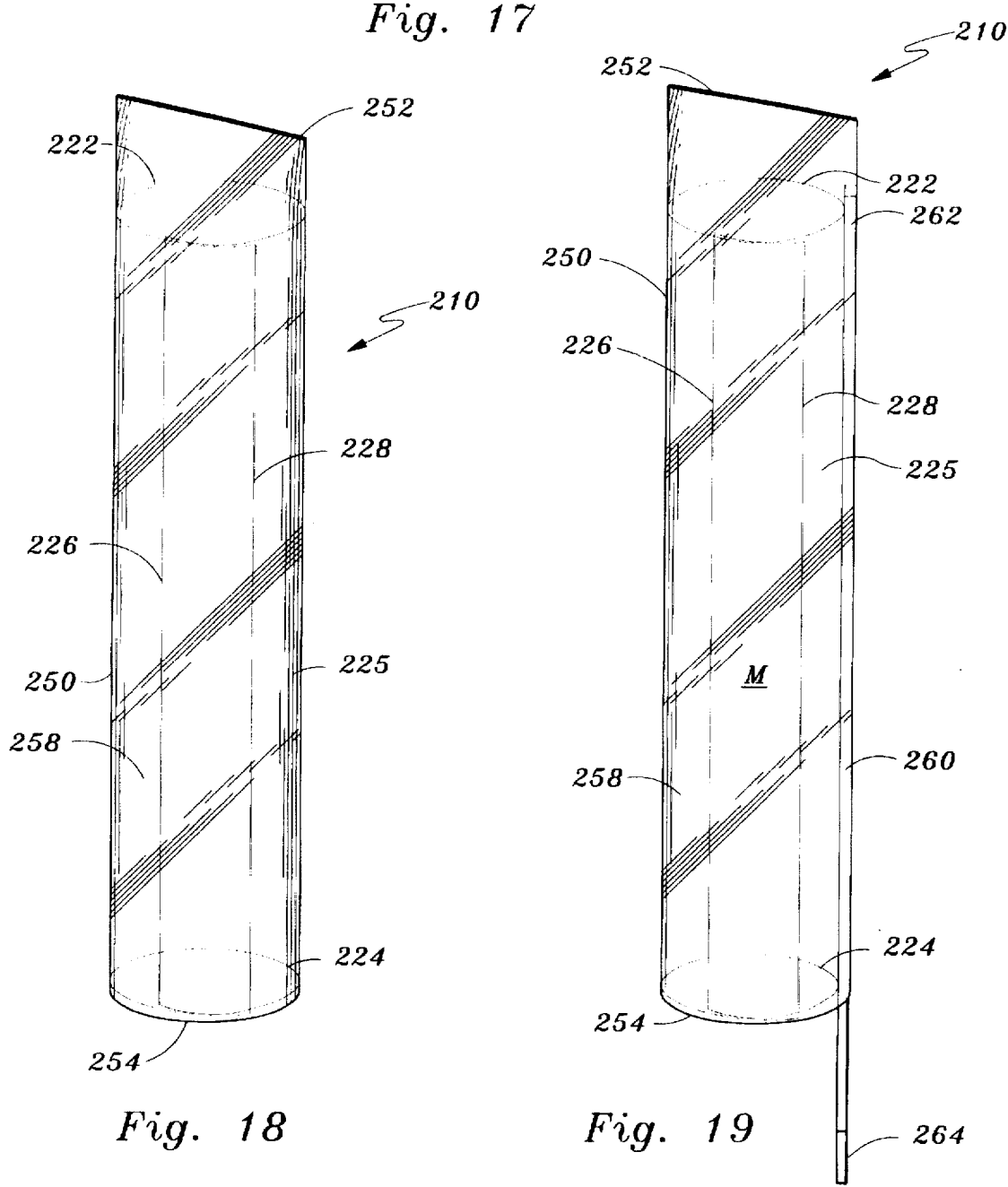

COLLAPSIBLE PLANT SHELTER

FIELD OF THE INVENTION

The following invention relates to shelters to protect and assist in the growth of plants during planting and also from early growth to maturity. More particularly, this invention relates to plant shelters which are readily collapsible and erectable so that the shelters can be easily stored and transported when not in use and easily repeatedly reconfigured for use.

DESCRIPTION OF THE RELATED ART

Shelters have long been in use for the protection of plants from various hazards during their period of early growth. For instance, shelters can prevent animals from eating or trampling the plants and extreme wind and other elements are prevented from breaking or uprooting the young plants. Shelters can also shield a cultivated plant from herbicides sprayed by a grower to eliminate weeds surrounding the cultivated plant but on an exterior of the shelter. More recently, shelters have been constructed which provide a barrier which completely surrounds the young plant except at the top these shelters transmit light somewhat therethrough and yet prevent wind from blowing horizontally through the shelter. In this way, a microclimate is established surrounding the young plant. This microclimate has low wind speeds and is somewhat shaded by reducing wind adjacent the plant. Dehydration of the plant through evaporation is reduced within the microclimate, allowing the plant to be better nurtured and increasing the likelihood that the plant will survive into maturity as a strong and healthy plant.

However, young plants are not entirely protected by these existing shelters and even when the plants survive, they are not as large and as strong as they could be if additional measurements were taken. Research has shown that ultraviolet radiation is harmful to plant growth and can damage DNA of the plant. Other portions of the light spectrum have been shown to be beneficial to healthy plant growth. It follows that a shelter which transmits beneficial radiation and blocks harmful radiation can further improve plant growth and health.

The prior art includes numerous attempts to provide plant shelters for optimizing plant growth. Many of these shelters are documented in the work: tree shelters—Handbook 7 authored by Mark J. Potter and published by The Forestry Commission. While these and other prior art shelters do generally provide a microclimate region for a growing plant, these shelters suffer from many drawbacks. One deficiency is that many of these shelters are substantially rigid and incollapsible. Other shelters, such as the shelter described by Great Britain patent application GB 2129664A, do provide a flexible collapsible shelter, but require a separate clip to hold the shelter in its deployed position. The clip is necessarily bulky and incapable of laying flat for storage. Hence, these shelters cannot be efficiently stored or shipped in that they occupy excessively large space when large volumes of tree shelters or other plant shelters are required.

For instance, a need exists for the use of plant shelters in many agricultural environments, such as in vineyards. In such a cultivated environment, it is not uncommon for thousands of shelters to be utilized per acre of cultivated land. Without collapsible shelters, entire warehouses can be required for the storage of the tree shelters. When transportation of the shelters is required, only a relatively small number of shelters can be shipped in a given space, such as within a vehicle trailer. When the costs of shipping and storage of plant shelters are added to the cost of the shelters themselves, the overall benefits of the use of these shelters are significantly diminished.

Hence, a need exists for a plant shelter which is readily collapsible and re-erectable between a stored position which occupies as little volume as possible and a deployed position ready for use as a plant shelter. Such a collapsible plant shelter would need to be sufficiently rigid when in the deployed/erected position to insure that wind and other environmental conditions do not displace or deform the shelter when the shelter is in use surrounding a plant. Additionally, such a shelter would need to be readily erectable and collapsible, requiring only a minimal amount of equipment, skill and time to erect the shelters from their collapsed position. With such a collapsible shelter, a large number of shelters can be shipped and stored before they are ready for use, then readily erected when needed.

SUMMARY

The collapsible plant shelter of this invention forms a barrier surrounding the young plant from as early as when the plant is merely a seed to when the grower has decided that the shelter is no longer necessary. The shelter is configured as a cylinder having either elliptical cross section or a polygonal cross section and which is open at the top and bottom. Hence, when the shelter is oriented with a long axis thereof vertical, one open end at a top thereof allows for gentle circulation of air and other gases into and out of a microclimate within the shelter. The opposite open end of the shelter can be embedded in the soil, allowing roots of the plant to grow down into the soil and out of the shelter.

The wall is formed from a film of material which has desirable radiation absorption characteristics and radiation transmission characteristics such that conditions within the shelter can be optimized for plant growth. The material forming the wall exhibits a combination of both resiliency and flexibility. The flexibility characteristic of the material allows the material to be rolled or bent such that a single originally planar piece of material can be flexibly reconfigured into the cylinder of the shelter. The resiliency feature of the material causes the originally planar sheet of film material to readily return to its planar configuration unless restrained in cylindrical form. This resiliency characteristic discourages the film of material from collapsing or crumpling when the film of material is rolled into an elliptical or circular cylinder. Rather, the resiliency of the material causes the material to seek as flat a contour as possible at every location on the material. Hence, when the film of material is rolled into a circular cross section, the resiliency of the material discourages the shelter from being flattened into a configuration which is too elliptical and flat to allow the plant within the shelter to have sufficient room to grow without obstruction.

The material forming the wall of the shelter is restrained from resiliently returning to its planar configuration by a flexible sleeve of material. The sleeve surrounds the wall formed by the resilient material and restrains the wall from returning to a planar orientation. The shelter can be readily erected from a planar sheet of the film of material forming the wall by merely rolling the material into a cylinder and inserting the cylinder into the sleeve so that the sleeve surrounds the cylinder. When the resiliency of the material attempts to cause the film of material to return to a planar orientation, it is resisted by the sleeve and forms a cylinder of substantially circular, but possibly slightly elliptical cross section. When the shelter is to be collapsed for storage or transportation, the film of material is merely removed from within the flexible sleeve and allowed return to a planar flat configuration. The sleeve is sufficiently flexible and non-resilient that it can be allowed to be compressed into a flat orientation for storage or transportation with other sleeves. For instance, a perforated roll of multiple individual sleeves removably connected together can be provided similar to rolls of clear plastic produce bags provided in the produce sections of most grocery stores.

As an alternative to the sleeve in restraining the film of material, the film can be rolled into a cylinder and permanently connected to itself where side edges of the film of material overlap each other. Such attachment can occur with adhesives or mechanical fasteners. Once permanently attached onto itself, the film cannot be returned to a single planar orientation. However, if the material is creased from a top edge of the material to a bottom edge of the material at numerous parallel locations, and these creases are appropriately located, the shelter can be flattened. A compressive force is applied on the cylinder, allowing certain of the creases opposite each other to be flattened into a single plane and certain of the other creases to be flattened against themselves into adjacent parallel planes. For instance, a cylinder with four creases and having a substantially square or rectangular cross section would be flattened such that two of the creases opposite each other would change from having an interior angle of approximately 90° to having an interior angle of approximately 180° and two of the creases opposite each other would have interior angles thereof transformed from approximately 90° to approximately 0°.

The inventor has discovered that once appropriate materials are selected, creasing of the material allows the material to be either totally flattened at the crease as if not creased or totally folded upon itself at the crease, and still have sufficient resiliency to return to a cylindrical polygonal cross section shape provided by the creases before compression of the shelter. Hence, when the material forming the wall of the shelter is creased and permanently sealed to itself, it can be flattened such that numerous shelters can be collapsed and stored together by merely maintaining the compressive force on the shelters. When the compressive force is removed, the shelters return to their original configurations.

Accordingly, a primary object of present invention is to provide a plant shelter which can be readily erected and collapsed, allowing a user to selectively deploy and use the shelter when desired and collapse and store the shelter when desired.

Another object of the present invention is to provide a plant shelter formed from a material which has sufficient resiliency to maintain an elliptical cross section when rolled into a cylinder.

Another object of the present invention is to provide a plant shelter which can be constructed without the need for fasteners or special equipment.

Another object of the present invention is to provide a plant shelter which can be economically stored and transported in large numbers while occupying minimal space.

Another object of the present invention is to provide a shelter which can be erected with very little effort when desired.

Another object of the present invention is to provide a plant shelter which is collapsible and re-erectable and which is formed of a material which selectively blocks harmful radiation and transmits beneficial radiation.

Others objects of this invention will become apparent from a careful reading of the detailed description of the invention and from the claims.

BRIEF DESCRIPTION OF THE DRAWINGS

FIG. 2 is a plan view of a film of material forming a portion of that which is shown in FIG. 1, before it is rolled into a cylinder.

FIG. 3 is a plan view of a sleeve portion of this invention with open ends.

FIG. 4 is a plan view of an alternative embodiment of the sleeve of FIG. 3 which has one end thereof sealed closed.

FIG. 5 is a perspective view of the shelter of this invention with the film of material of FIG. 2 rolled into a cylinder and oriented within the transparent sleeve of FIG. 3.

FIG. 6 is a top plan view of that which is shown in FIG. 5.

FIG. 7 is a perspective view revealing the process of erecting and collapsing the shelter of this invention.

FIG. 8 is an elevational view of two plant shelters one nested within the other to provide for one method of transplanting a plant within the plant shelter.

FIG. 9 is an elevational view of the device of this invention in use surrounding a young grape vine in a vineyard.

FIG. 17 is top plan view of an alternative embodiment of the plant shelter of this invention utilizing the closed end sleeve of FIG. 4.

FIG. 18 is an elevational view of that which is shown in FIG. 17.

FIG. 19 reveals the use of a vertical support stake with the device shown in FIG. 18.

DESCRIPTION OF THE PREFERRED EMBODIMENTS

Figure 1:
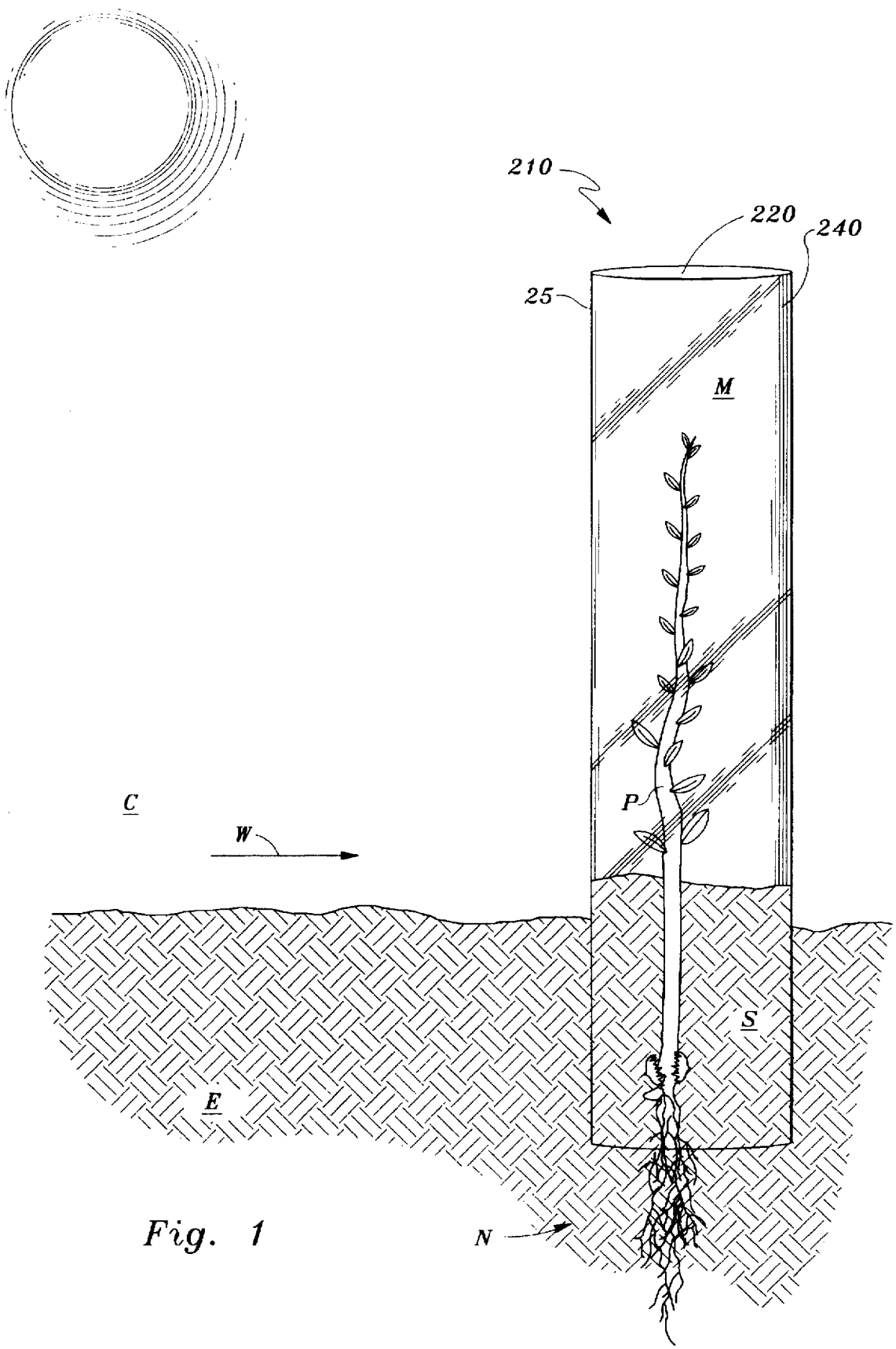
FIG. 1 is an elevational view of the device of this invention in its intended environment surrounding a young plant.
Figure 10:
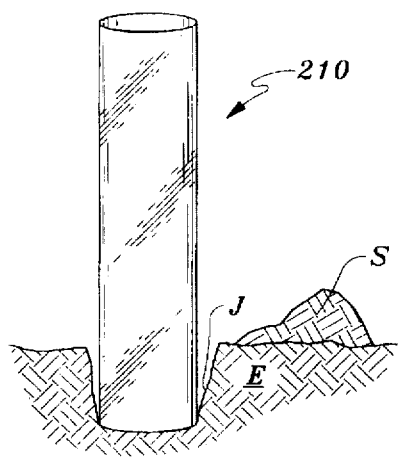
FIGS. 10 through 15 are sequential elevational views of the device of this invention revealing steps in a planting process utilizing the device of this invention.
Figure 11:
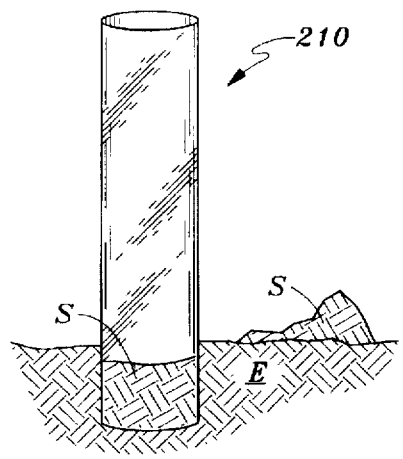
Figure 12:
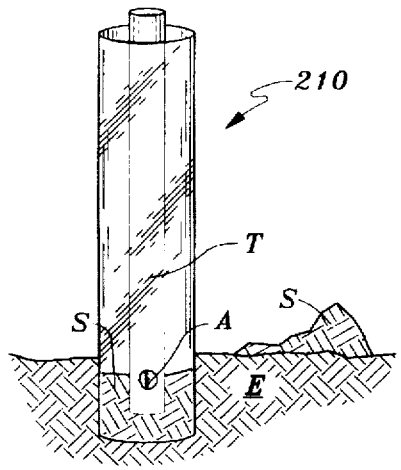
Figure 13:
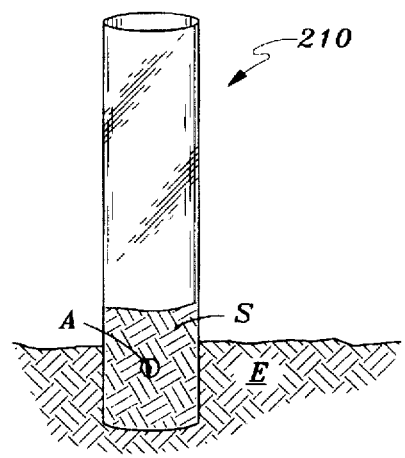
Figure 14:
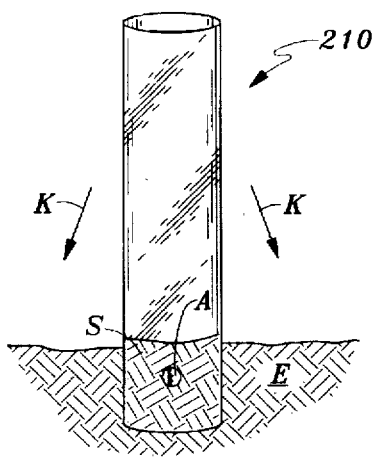
Figure 15:
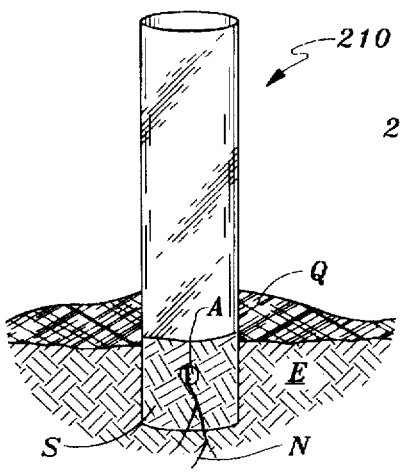

With particular reference to the drawing figures, wherein like reference numerals represent like parts throughout the drawing figures, reference numeral 210 is directed to a collapsible plant shelter (FIG. 1). The collapsible plant shelter 210 provides a microclimate M surrounding a plant P so that the plant P is isolated from an exterior climate C and protected somewhat from wind W and solar radiation.

In essence, and with reference to FIGS. 1 through 7, the collapsible plant shelter 210 is formed from a film of material 220 and a sleeve 240. The film 220 is constructed from flexible resilient material which allows the film 220 to be rolled into a cylindrical wall 225. The cylindrical wall 225 can be then be inserted into an interior 246 of the sleeve 240. The resilient characteristic of the material forming the film 220 causes the cylindrical wall 225 to exert an outward pressure on the sleeve 240, creating a substantially rigid cylindrical wall 225 which then provides the microclimate M for the collapsible plant shelter 210. When a user desires to collapse the collapsible plant shelter 210, the cylindrical wall 225 is removed from the interior 246 of the sleeve 240 and returned to its planar film 220 configuration.

More specifically, and with particular reference to FIGS. 2 through 7, details of the collapsible plant shelter 210 are described. Before the collapsible plant shelter 210 is erected, the shelter 210 includes a planar film 220 of resilient flexible material and a flexible non-resilient sleeve 240. While the film 220 can be formed from a variety of materials which have the desired flexibility and resiliency, one material which has been found to be particularly effective is polyester film which is marketed by the DuPont Company with the name Mylar. The material forming the film 220 must not only be resilient and flexible but also be at least partially transparent to light and be able to withstand outside environmental conditions.

The film 220 has been found to be particularly useful when it selectively allows light corresponding to a blue wavelength to be transmitted therethrough more readily than other wavelengths of light. Additionally, it is preferred that the material be able to absorb or reflect ultraviolet radiation such that the ultraviolet radiation can not pass into the microclimate M within the collapsible plant shelter 210. Such an ultraviolet absorbing or reflecting quality can either be inherent in the material forming the film 220 or can be applied as a coating to either an inside surface 230 of the film 220 or an outside surface 232 of the film 220. Hence, once the film 220 is surrounding a plant P, the plant P is provided with shade and shielded from ultraviolet radiation while receiving a disproportionate amount of light corresponding to the color blue.

The film 220 preferably has a lowest energy geometric form which is planar. The material has sufficient resiliency that when no force is applied to the film 220, the film 220 naturally seeks its lowest energy geometric form, that of a plane. However, the material forming the film 220 is also sufficiently flexible that when a force is applied to the film 220, the film 220 can be readily distorted into other shapes. For instance, the film 220 can be rolled into a cylinder such that a first side edge 226 overlies a second side edge 228. Preferably, the material is sufficiently flexible that this rolling procedure can be performed by hand as shown in FIG. 7. The material forming the film 220 is preferably sufficiently resilient that when the film 220 is rolled into a cylindrical wall 225, the resiliency of the film 220 causes the film 220 to seek a configuration as close to planar as possible. Hence, a curvature of the film 220 is minimized and the film 220 naturally forms a cylinder of approximately circular cross section, though typically somewhat oval or elliptical.

So long as the film 220 is restrained from returning to its planar orientation, the film 220 will maintain its cylindrical orientation. Hence, when a means to restrain the cylindrical wall 225 is orientated at least partially surrounding the cylindrical wall 225, the cylindrical wall 225 will remain in its cylindrical configuration rather than returning to the planar configuration of the film 220 before being rolled into the cylindrical wall 225. In essence, if the restraining means surrounds more than half of the cylindrical wall 225, sufficient force can be supplied to the cylindrical wall 225 to keep it in a cylindrical orientation.

Preferably, this restraining means is supplied by a sleeve 240 of flexible material. The sleeve 240 is open at both an upper end 242 and a lower end 244 and includes an interior 246 opposite an exterior 248. The sleeve 240 is preferably substantially inelastic, such that the sleeve 240 cannot be stretched. However, the sleeve 240 is preferably sufficiently flexible and non-resilient that it has no particular preferred shape, but rather can be bent into whatever shape results when forces are applied.

One material which has been found to be effective in forming the sleeve 240 is polyethylene. When a polyethylene sheet of sufficiently thin dimension is constructed, it can obtain the desired flexibility. The material forming the sleeve 240 is also preferably at least partially transparent, such that light is allowed to pass through the sleeve 240 and the film 220 forming the cylindrical wall 225.

As shown in FIG. 7, when the cylindrical wall 225 is oriented within the interior 246 of the sleeve 240, the user can release the cylindrical wall 225 and allow the sleeve 240 to restrain the film 220 in the cylindrical configuration of the collapsible plant shelter 210. The interior 246 of the sleeve 240 is preferably sized such that when it is expanded into an approximately circular cross section it has a circumference which is less than a width of the film 220 between the first side edge 226 and the second side edge 228. In this way, the film 220 is caused to overlap at the first side edge 226 and the second side edge 228 when rolled into the cylindrical wall 225. Preferably, as shown in FIG. 6, the film 220 and sleeve 240 are sized such that the first side edge 226 and second edge 228 overlap by approximately 25 percent of the overall circumference of the collapsible plant shelter 210. Preferably, a diameter of the sleeve 240 when expanded is approximately three to five inches.

While the sleeve 249 is preferably formed of polyethylene, any sufficiently flexible, non-resilient material can be used. Some materials tend to degrade when exposed to high temperatures and or solar radiation. In one form of the invention, such degrading materials can be used to automatically collapse the shelter 210 when no longer needed by the plant P. For instance, if the shelter 210 is primarily used to prevent frost, but is unnecessary when the full sun of summer is available, a degrading sleeve 240 can be used. The plant P would then benefit from the shelter 210 until the heat and solar radiation exceeded a desired amount. The sleeve 240 would be constructed of a material which would fail at this desired point. Hence, the sleeve 240 would split away from the film 220 and the film 220 would resiliently fall flat to the earth E for collection and reuse with a new sleeve 240.

In use and operation, the collapsible plant shelter 210 is constructed and used in the following manner. Initially, the film 220 is rolled into the cylindrical wall 225 such that the first side edge 226 and second side edge 228 overlap each other significantly. The cylindrical wall 225 is then inserted into the interior 246 of sleeve 240 (FIG. 7), causing the sleeve 240 to be extended out into a cylindrical form with the cylindrical wall 225 nested within the interior 246 (FIGS. 5 and 6). The collapsible plant shelter 210 is then in a configuration where it is ready to be used in a variety of different environments as a plant shelter.

For instance, and as shown in FIGS. 8 and 9, multiple collapsible plant shelter 210 can be utilized to allow for transplanting of a plant P to different locations and from a smaller plant shelters 210 to a larger plant shelter 210'. The cylindrical wall 225 of the collapsible plant shelter 210 is sized with a smaller diameter than the cylindrical wall 225' of the larger collapsible plant shelter 210'. Such a nesting of collapsible plant shelters 210, 210' can also provide for additional shade and further modification of the microclimate M within the collapsible plant shelters 210.

The collapsible plant shelter 210 can be utilized in a grape vineyard by starting the plant P within the collapsible plant shelter 210 at a remote location and then transplanting the plant P along with the collapsible plant shelter 210 at a location where desired. For instance, the collapsible plant shelter 210 can be oriented between line supports 276 supporting a vine line 272. Portions of the plant P can then be trained around the vine line 272. The collapsible plant shelter 210 can be supported in its vertical orientation by placing a hole 270 through the cylindrical wall 225 adjacent to the top edge 222. A fastening wire 274 can then be oriented through the hole 270, around the vine line 272 and then fastened back upon itself. The collapsible plant shelter 210 will also have the bottom edge 224 sufficiently grounded in the earth E such that the collapsible plant shelter 210 will not be displaced by wind or other forces. Once in place, the shelter 210 not only provides protection from natural hazards, but also allows a grower to spray herbicide without as great a risk of hitting the plant P.

One unique advantage of the collapsible plant shelter 210 is that when the shelter 210 is utilized as shown in FIG. 9 in a vineyard, and portions of the plant P begin to grown out above the top edge 222 of the cylindrical wall 225 and horizontally along a vine line 272, the plant shelter 210 can still be removed and reused. To remove the plant shelter 210 in such a circumstance, the sleeve 240 is torn away form the cylindrical wall 225 and the cylindrical wall 225 is allowed to return to its flat orientation. The fastening wire 274 is also removed from the cylindrical wall 225. The remaining film of material 220 of the collapsible plant shelter 210 can then be reused with a new sleeve 240 as discussed above. Vertical support of the collapsible plant shelter 210 can also be supplied by orienting a stake between the sleeve 240 and the cylindrical wall 225. Also, if the bottom edge 224 is sufficiently deep within the earth E, the resiliency of the film 220 can maintain the collapsible plant shelter 210 in a vertical orientation without additional support.

With reference to FIGS. 10 through 15, particular steps in one form of utilization of the collapsible plant shelter 210 are shown. Initially, the collapsible plant shelter 210 can be oriented within a hole J in the earth E by removal of soil S from the earth E. The collapsible plant shelter 210 is then loaded with a portion of the soil S on an interior thereof. A seed A can then be oriented within the soil S within the collapsible plant shelter 210, such as with a planting tube T. Finally, additional soil S can be oriented over the seed A within the collapsible plant shelter 210. At any point, sprays such as weed killer K can be indiscriminately sprayed in an area surrounding the collapsible plant shelter 210 without concern that the weed killer K will hamper growth of the seed A. Straw Q can be oriented around the shelter 210 without concern that too much straw Q will overlie the seed A and diminish its ability to grow. As the root network N begins to grow, it can readily grow out through the collapsible plant shelter 210 below the bottom edge 224. Eventually, the plant P forms above the soil S as shown in FIG. 1.

As an alternative to growing the seed A within the collapsible plant shelter 210 while the collapsible plant shelter 210 is oriented within the earth E, the seed A can be oriented within the collapsible plant shelter 210 when the collapsible plant shelter 210 is not oriented within the earth E, such as within a carrying tray often used in the nursery environment. Typically, a significantly larger amount of soil S would be oriented within the collapsible plant shelter 210 to insure that the root network N would have sufficient soil S before experiencing air pruning when the root network N extends down to the bottom edge 224 of the cylindrical wall 225. Because the root network N is air pruned, a root bail is prevented from forming and a more healthy root network is established.

Figure 16:
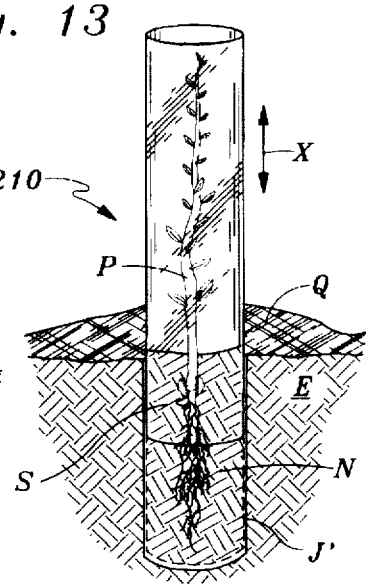
FIG. 16 is an elevational view of the device of this invention in use for transplanting.

Preferably, the film 220 forming the cylindrical wall 225 has a glossy low friction surface. Hence, when the plant P is ready for transplanting, a hole J' can be formed in the earth E and the shelter and plant P oriented within the hole J' in the earth E. The shelter 210 can then be lifted vertically upward and readily slide vertically along arrow X of FIG. 16, to a higher position where it can then act as a plant shelter 210 for further enhancing plant growth P. Alternatively, if the shelter 210 is no longer needed it can be totally removed vertically along arrow X. Because the surfaces of the cylindrical wall 225 are slick, root damage is diminished. Also note that the root network N is never exposed to the air in such a transplanting procedure. Hence, a particularly natural transplanting procedure occurs with limited trauma to the plant P.

With reference now to FIGS. 4 and 17 through 19, details of a alternative embodiment of the collapsible plant shelter 210 are shown. In this embodiment, the cylindrical wall 225 is formed from film 220 in a manner similar to that described in the preferred embodiment above. However, the sleeve 240 of the preferred embodiment is replaced with a closed sleeve 250. The closed sleeve 250 includes a top end 252 opposite a bottom end 254. The closed sleeve 250 is similar to the sleeve 240 except that the top end 252 is sealed shut. Hence, when the cylindrical wall 225 is oriented within the closed sleeve 250, a closed top collapsible plant shelter 210 results. Also, the top end 252 could be only partially sealed so that some air exchange could still occur into and out of the microclimate M within the plant shelter 210 (see FIG. 1). In essence, the closed sleeve 250 provides for a microclimate M which is more distinct in nature from the climate C surrounding the collapsible plant shelter 210. As shown in FIG. 19, a stake 260 can be easily oriented between the closed sleeve 250 and cylindrical wall 225 with a top 262 of the stake 260 adjacent the top end 252 and the tip 264 extending below the bottom 254 for orientation within the earth E (FIG. 1).

With reference now to FIGS. 20 through 24, details of another alternative embodiment of the collapsible plant shelter 210 are described. A square shelter 310 is provided which is formed from a film of material similar to the film 220 of the preferred embodiment. However, the film 220 is provided with a plurality of creases 320. Each crease 320 is preferably parallel to adjacent creases and parallel to a first side edge 326 and a second side edge 328. These creases 320 are preferably formed so that they naturally assume an interior angle of approximately 90°. In such a configuration, the square shelter 310 has a square cross section.

Note that the square shelter 310 could also have the creases 320 oriented such that the square shelter 310 would actually be rectangular. Also, four creases 320 could be provided of varying angular measurements such that the square shelter 310 would actually be somewhat trapezoidal or rhomboid. In addition to four-sided cylindrical shelters 310, other polygonal cylinders could also be formed by providing additional numbers of creases 320. For instance, if six creases were provided for the shelter 310 a hexagonal shelter would be provided. Both odd and even numbers of creases 320 can be provided, so long as there are at least three creases. By providing the shelter 310 with an even number of creases 320, each crease 320 can be oriented directly opposite another crease 320. With creases 320 oriented directly opposite each other, the creases 320 are more readily able to be flattened to a 180° interior angle or folded to a 0° interior angle so that the shelter 310 can be completely flattened without exceeding an elastic limit of the film 220 and causing cracking or additional creasing of the square shelter 310 at undesired locations.

The square shelter 310 includes an upper edge 312 opposite a lower edge 314. Corners 316 are oriented between flat sides 318 of the square shelter 310. Preferably, five flat sides 318 are provided and four corners 316 are provided. Hence, two flat sides 318, adjacent the first side edge 326 and the second side edge 328, are oriented overlying each other. Three remaining flat sides 318 are oriented without any overlapping adjacent sides.

To maintain the square shelter 310 in a rigid cylindrical form with a square cross section, the two overlapping flat sides 318 are connected together in a permanent fashion. Such connection preferably occurs with the use of adhesive 350 oriented on the inside surface 330 of one of the overlapping flat sides 318 and the outside surface 340 of the other of the overlapping flat sides 318. Preferably, the adhesive 350 is oriented at two locations adjacent the corners 316 which themselves are adjacent to the overlapping flat sides 318. By orienting the adhesive 350 at two locations spaced from each other, a pocket 360 is provided between the locations where the adhesive 350 is oriented. This pocket 360 can then be accessed for placement of a stake 260 such as that shown in FIG. 19. The adhesive 350 is preferably continuous from the upper edge 312 to the lower edge 314. As an alternative to the adhesive 350, staples or other mechanical fasteners can also be used as well as a variety of other connecting means.

Figure 21:
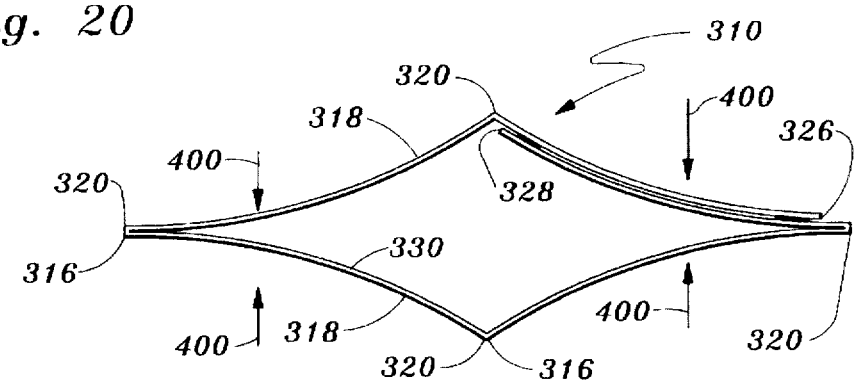
FIG. 21 is a top plan view of that which is shown in FIG. 20 when a force is applied beginning to compress the shelter into a low volume collapsed configuration.

While the square shelter 310 is preferably formed with permanent adhesive 350 or other fastening means, the square shelter 310 still exhibits a collapsible characteristic. As shown in FIG. 21, when a compressive force 400 is applied laterally to the square shelter 310, two of the corners 316 opposite each other are caused to change in interior angle from 90° to approximately 180°. As the compressive force 400 is applied, the other angles are modified from having an interior angle of approximately 90° to an angle of approximately 0°.

While the material forming the square shelter 310 is resilient, it cannot be flexed significantly more than 90° from its original form without cracking or altering the preferred 90° angle of the corners 316. Hence, if a section of a flat side 318 of the square shelter 310 originally has a flat orientation with an angular measurement of approximately 180°, and then is folded over onto itself to an angular measurement of 0°, cracking or an unwanted crease would form. However, by providing creases 320 in the square shelter 310 which have an interior measurement of approximately 90°, the material can be resiliently temporarily bent at each crease 320 by flattening to have an angular measurement of approximately 180° or by folding onto its serf so that it has an angular measurement of approximately 0°. In either the flattened or the folded orientation, the crease 320 retains its resilient characteristic, so that when the compressive force 400 is released, the square shelter 310 snaps back to its original orientation as shown in FIG. 20.

Figure 20:
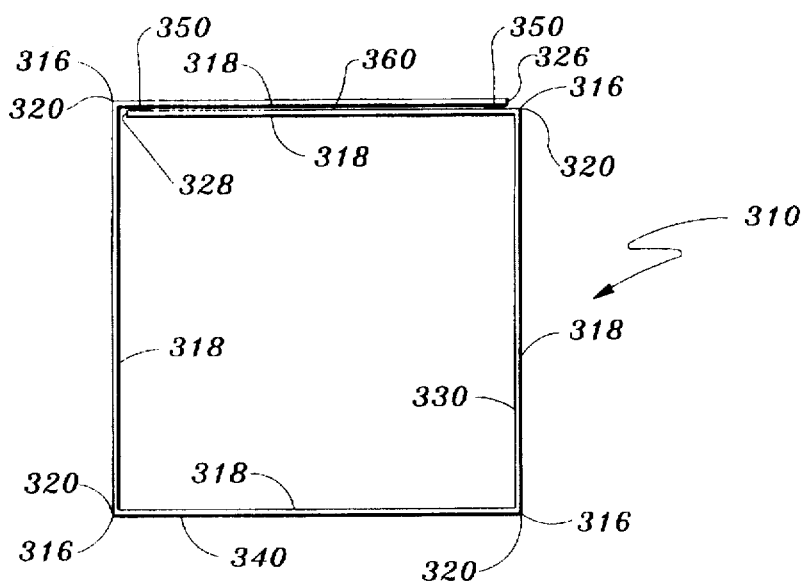
FIG. 20 is a top plan view of alternative embodiment of that which is shown in FIGS. 1 and 5 which includes creases, is coupled to itself along an overlapping portion, and does not require the use of a sleeve.
Figure 22:
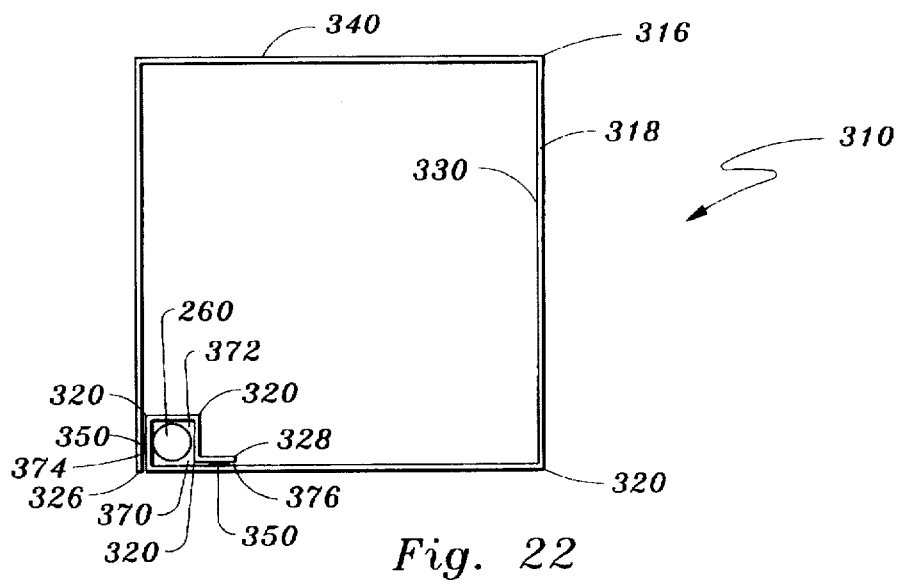
FIG. 22 is a top plan view of an alternative embodiment of that which is shown in FIG. 20 including a pocket in one corner thereof for receiving a support stake therethrough.

The square shelter 310 can either have a simple orientation as shown in FIG. 20 or it can be configured as shown in FIG. 22 to include a crease pocket 370. The crease pocket 370 includes additional creases 320 oriented close together which form a cylinder of square or rectangular cross section, preferably within one of the corners 316 of the square shelter 310. This crease pocket 370 provides an inner region 372 through which a stake 270 can be oriented. The crease pocket 370 is held in place by providing a first adhesive point 374 between a portion of the crease pocket 370 and the first side edge 326. The second adhesive point 376 is oriented between the second side edge 320 and a portion of a flat side 318 of the square shelter 310 adjacent the crease pocket 370.

Figure 23:
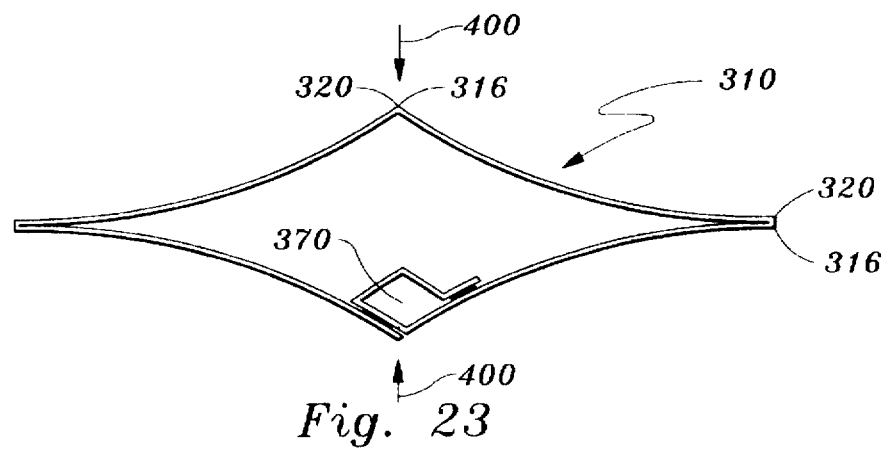
FIG. 23 is a top plan view of that which is shown in FIG. 22 when a compressive force is beginning to be applied to the shelter, causing the shelter to be flattened into a collapsed orientation.

As shown in FIG. 23, by orienting the crease pocket 370 within one of the corners 316, the crease pocket 370 can be flattened in a manner similar to the square shelter 310 itself when a compressive force 400 is applied. Hence, when the square shelter 310 is to be stored or shipped, a plurality of square shelters 310 can be stacked together and then flattened with a compressive force 400. Such a force 400 could be provided by a weight or by sealing a stack of square shelters 310 within a shipping or storage box. The force 400 would be applied to the shelter along a line perpendicular to a line extending between two opposite corners 316. When the square shelters 310 are to be re-erected for use, the compressive 400 need merely be removed. The resiliency of the film 220 forming the square shelter 310 will then cause the square shelter 310 to snap back to its original substantially square cross section.

Figure 24:
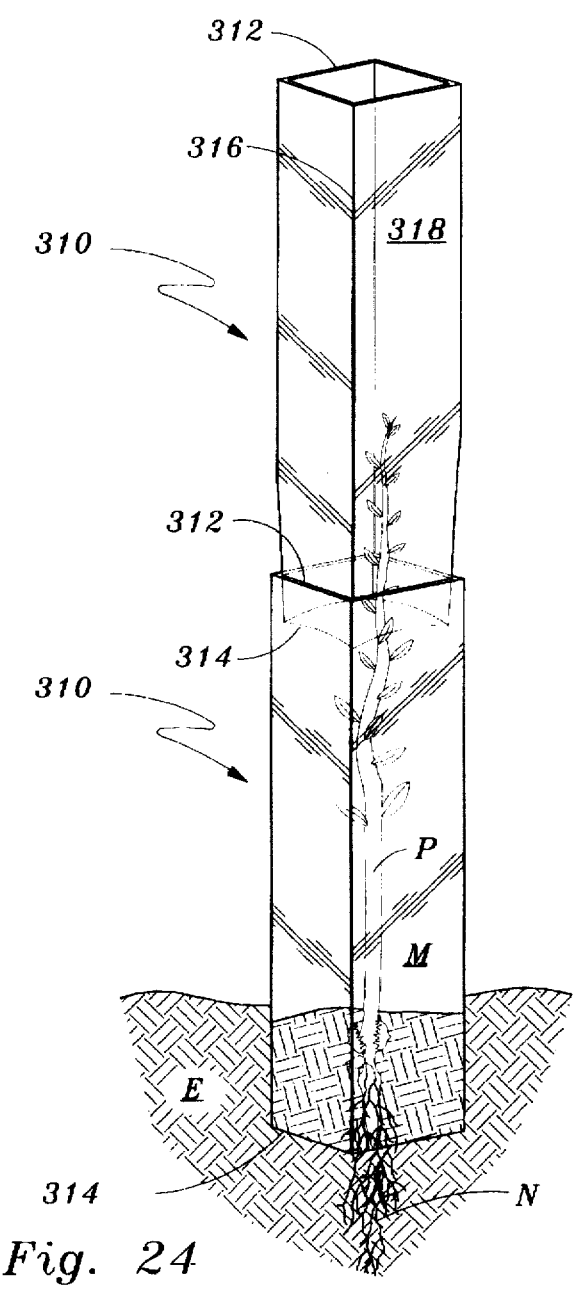
FIG. 24 is an elevational view of a serious of shelters such as those shown in FIGS. 20 through 23 revealing how multiple shelters can be partially nested one within the other to create a longer shelter for a single plant.

The square shelter 310 can be used in a manner substantially similar to that of the cylindrical collapsible plant shelter having the elliptical cross section. One advantage of the square shelter 310 is that the multiple erected shelters 310 can be stacked vertically within a rectangular crate with no wasted space between shelters 310. Both the square shelter 310 and the collapsible plant shelter 210 can be nested vertically in series to provide shelters of adjustable height (FIG. 24). Initially, one shelter 210, 310 is oriented in the ground with a plant P therein. As the plant P grows out of the top of the plant shelter 210, 310, a second shelter 210, 310 is oriented with a lower edge 314 or bottom edge 224 nested within the upper edge 312 or top edge 222. The plant P can then continue to benefit from the microclimate M as it continues to grow.

While the above description provides the preferred embodiment of this invention, other embodiments are also possible by incorporating various features disclosed herein or their equivalents with other related structures. In addition, other uses, applications and advantages of this invention are apparent from the detailed description provided above by way of example, from the accompanying drawings, and from the spirit and scope of the appended claims.

What is claimed is:

1. A collapsible plant shelter for enhancing an environment surrounding a plant, comprising in combination:

a thin flexible resilient film of at least partially transparent material, said film of material exhibiting sufficient resilience and flexibility to allow said film to be rolled into a cylinder of substantially circular cross section, said film having sufficient resilience to return to a substantially planar form when unrestrained after being rolled into a cylinder, a seamless sleeve completely circumscribing an outside surface of said cylinder of film, said sleeve having sufficient strength to hold said film in cylindrical form, and said sleeve having sufficient flexibility to allow said sleeve to be collapsed flat while remaining configured as said sleeve when removed from said outside surface of said cylinder of film without permanent alteration of said sleeve.

2. The shelter of claim 1 wherein said film is formed from a material which allows a greater percentage of light corresponding to the color blue to be transmitted there through than light having wave lengths corresponding to any other colors.

3. The shelter of claim 2 wherein said film of material is substantially rectangular before it is rolled into a cylinder, said film having a linear top edge parallel to and spaced from a linear bottom edge.

4. The shelter of claim 3 wherein said sleeve surrounds 360° of said cylinder of film.

5. The shelter of claim 4 wherein said sleeve is a flexible tube of thin material which is at least partially transparent, said sleeve having a length similar to a distance between said bottom edge of said film and said top edge of said film, such that when said film is rolled into a cylinder and placed within said sleeve, said sleeve can completely cover said outside surface of said cylinder of film.

6. The shelter of claim 5 wherein said film includes a first side edge opposite and parallel to a second side edge, said first side edge and said second side edge substantially perpendicular to said top edge and said bottom edge, a width of said film between said first side edge and said second side edge being greater than a cross sectional circumference of said sleeve, such that said first side edge and said second side edge of said film overlap when said film is rolled into a cylinder and oriented within said sleeve.

7. The shelter of claim 6 wherein said sleeve includes an upper end and a lower end, and said upper end of said sleeve includes a closure at least partially closing said upper end of said sleeve, whereby when said film is rolled into a cylinder and oriented within said sleeve, a plant shelter is provided with an at least partially closed top portion.

8. The shelter of claim 6 wherein said film is formed from polyester.

9. The shelter of claim 8 wherein said film includes a coating thereon such that the film and coating together decrease an amount of ultraviolet radiation passing through said film, and wherein said film includes a coating thereon which blocks a portion of all light radiation impacting thereon, such that additional shade is provided within a microclimate maintained within said plant shelter.

10. The shelter of claim 9 wherein said sleeve is formed from polyethylene and is non-resilient.

11. A collapsible plant shelter for enhancing an environment surrounding a plant, comprising in combination:

a thin flexible resilient film of at least partially transparent material, said film of material exhibiting sufficient resilience and flexibility to allow said film to be rolled into a cylinder of substantially circular cross section, said film having sufficient resilience to return to a substantially planar form when unrestrained after being rolled into a cylinder, a sleeve completely circumscribing an outside surface of said cylinder of film, said sleeve having sufficient strength to hold said film cylindrical form, and wherein said sleeve is configured to degrade in strength when exposed to ultraviolet radiation sufficiently to cause a strength of the sleeve to decrease below a strength required to maintain said cylinder of film in a cylindrical shape, such that when a strength of the sleeve has diminished sufficiently, said cylinder of film breaks said sleeve and resiliently returns to a planar shape, collapsing said plant shelter.

12. A method for collapsing a plant shelter, including the steps of:

providing a collapsible plant shelter having a thin flexible resilient film of at least partially transparent material, the film of material exhibiting sufficient resilience and flexibility to allow the film to be wiled into a cylinder of substantially circular cross section, the film having sufficient resilience to return to a substantially planar form when unrestrained after being rolled into a cylinder, and a sleeve completely circumscribing an outside surface of the cylinder of film, the sleeve having sufficient strength to hold the film in cylindrical form;

breaking the sleeve so that the sleeve no longer circumscribes the outer surface of the cylinder of film, and providing the film with sufficient resilience that the film changes from the cylinder of film to a planar form once the sleeve is broken in said breaking step.

13. The method of claim 12 wherein said breaking step includes the step of exposing the sleeve to sufficient solar radiation to cause the sleeve to become more brittle and a strength of the sleeve to decrease to a level less than is necessary to restrain the cylinder of film in a cylindrical form, such that the film breaks the sleeve and the film returns to a planar form.

14. The method of claim 12 wherein said breaking step includes the step of cutting the sleeve along a line substantially parallel to a central axis of the cylinder of film, from a top of the sleeve to a bottom of the sleeve, such that the film returns to a planar form.

* * * * *